Nov. 9, 1943.  A. E. ANDERSON  2,334,056
ELECTRIC BROODER
Filed Feb. 4, 1942  2 Sheets-Sheet 1

Albert E. Anderson, Inventor

By A. B. McCall, Attorney

Patented Nov. 9, 1943

2,334,056

UNITED STATES PATENT OFFICE 2,334,056

ELECTRIC BROODER

Albert E. Anderson, Quincy, Ill., assignor to Brower Manufacturing Company, Quincy, Ill.

Application February 4, 1942, Serial No. 429,542

3 Claims. (Cl. 119—33)

My invention relates to housings for poultry and has a special purpose in connection with the shelter, protection, comfort and health of baby chicks.

A further purpose of my invention is to provide an economical, practical and reliable brooder for baby chicks.

A further purpose of my invention is to provide a more efficiently heated and ventilated brooder for baby chicks in a construction which is easy to control and economical to build and operate.

A particular purpose of my invention is to provide an electrically heated and electrically ventilated brooder for chicks, wherein there is a constant incoming supply of fresh air which is preheated by radiation before it reaches the warming chamber of the brooder and wherein the bottom air in the brooder is constantly being picked up and reheated and recirculated out over the warming chamber, defined by the housing of the brooder.

I attain my purposes in this brooder, which I shall now describe, and which is illustrated in the drawings.

Referring to the drawings.

Figure 1:
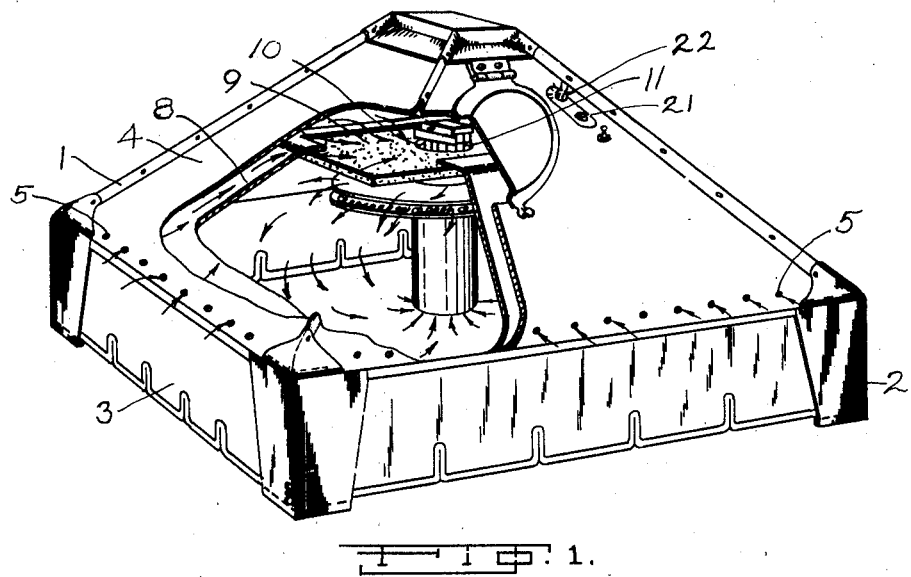
Figure 1 is a perspective of my electric brooder showing in a cut-away the interior details of the same.
Figure 2:
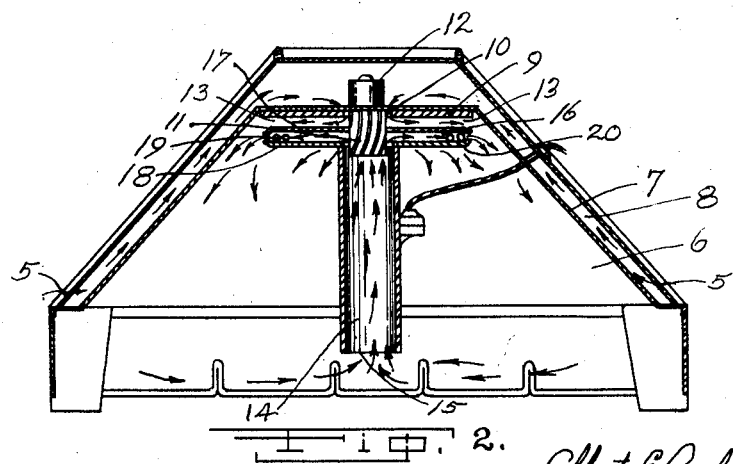
Figure 2 is a vertical half-section of my brooder.
Figure 3:
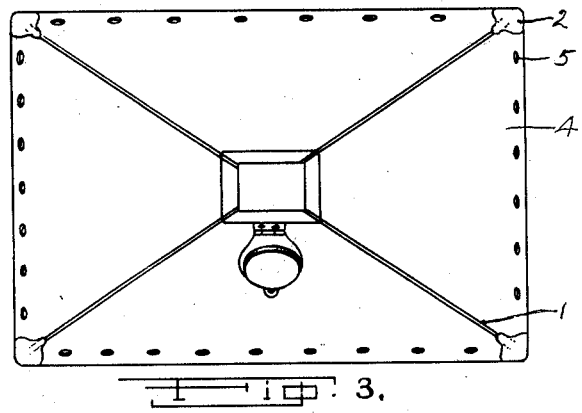
Figure 3 is a top view of my brooder.
Figure 4:
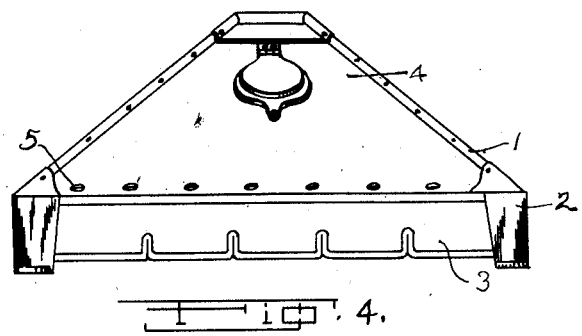
Figure 4 is a side view of my brooder.
Figure 5:
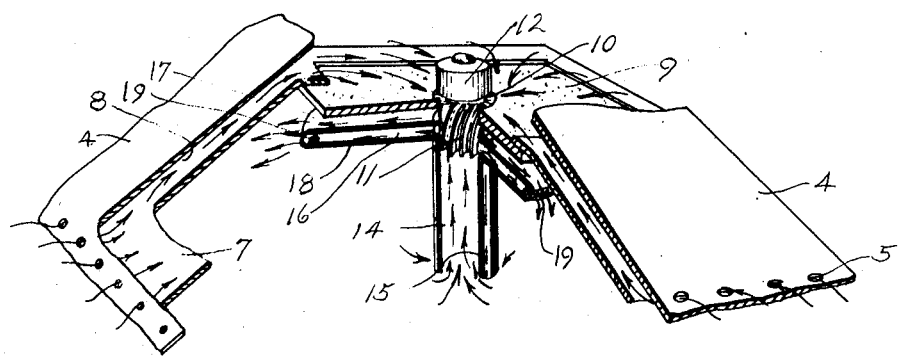
Figure 5 is an enlarged detail of the heating and air circulating features of my brooder.

I am familiar with the construction and operation of numerous brooders on the market; but, I am providing in my brooder features of novelty which it is thought, will add materially to the operating efficiency of both its heating and ventilating functions.

In order to disclose the novel merits of my invention, in a comprehensive manner, I shall now describe the essential details of its construction and operation, wherein a sheet material housing 1 supported on corner legs 2 and provided with a peripheral cloth curtain 3 to permit baby chicks to run in and out of the brooder freely; while in the preferred construction of my brooder, this housing is also shaped to define a sloping top 4 preferably sloping in all four directions from the central top and provided about its outer and lower periphery with a series of spaced fresh air intake holes or ports 5.

This brooder is provided with a novel organization of mechanical and electrical means not only for heating and recirculating the air in the brooder chamber 6 which obviously should be kept at a moderate uniform temperature, but it is also adapted to preheat an ample supply of incoming fresh air by a novel, practical and economical arrangement which will prevent any chance of cold air entering the brooder and being circulated through the warming chamber in any manner which would strike baby chicks and chill them before such air had a chance to become properly heated.

For instance, in my brooder, it will be noted in the drawings that I am providing a fixed ceiling plate 7 under the housing top 4 and thinly spaced therefrom to define a space 8 under top 4 for the free and easy passage of incoming fresh air entering this space 8 through the series of air intake holes or ports 5. Thus by providing this ceiling plate 7 over warming chamber 6, this plate is kept warm at all times and will have a very effective tendency to radiate a moderate, uniform heat up into space 8 meeting the incoming fresh air and preheating the same before it is circulated through the heating chamber 6.

This ceiling plate 7 has its inner and upper periphery fixed in its connection with an insulation board 9 over which this fresh air entering space 8 from all directions will move as it approaches a central hole 10 in board 9 wherein I have provided an electric fan 11 rotated by a motor 12 for circulating the air in the brooder.

Fan 11 will have a tendency to pull the fresh air up through thin space 8 as this air is being preheated by radiation and will throw this air outwardly in every direction through a space 13 under insulation board 9 thus promptly circulating the fresh air out through the upper portion of the heat chamber 6.

However, in addition to this feature of merit in my brooder, I am providing an upright central tube 14 reaching down almost to the bottom or floor of warming chamber 6 where the open bottom end 15 of tube 14 will pick up the bottom air from this warming chamber where this air will move upwardly through tube 14 where it is drawn by fan 11 until the fan effectively forces this bottom air outwardly through a heating unit 16 defined by an upper sheet material plate 17 slightly spaced above and parallel to lower sheet material plate 18, thus arranged to provide a sort of hollow disk passage or space for the divergent movement or circulation of the air that has been picked up by tube 14 from the bottom of chamber 6.

Thus when fan 11 lifts this bottom air up through tube 14 to the level of heating unit 16, it will then blow or force this air out through the space between plate 17 and plate 18 of the heating unit causing this circulating air to come in direct contact with the heating elements 19 fixed in their operative position about the periphery 20 of the heating unit 16 and result in reheating such air as has already been circulated through chamber 6.

It is thus obvious that in my brooder, I am not only reheating the air of the warming chamber of the brooder periodically and uniformly circulating the same but I am also preheating an ample supply of incoming fresh air at a moderate temperature that will at all times avoid chilly drafts for the baby chicks.

It will be obvious that a thermostat 21 and a pilot light 22 will be at all times utilized to the advantage and safety of the baby chicks in connection with their protection in my brooder.

Having thus described the nature of my invention, what I claim is:

1. A brooder for chicks and comprising, a sheet material housing, shaped to define a warming chamber, an upright vent tube spaced from the bottom central floor of said chamber, an insulation board above said tube and provided with a central hole over said tube, said housing having a plurality of air intake ports about its periphery, and a ceiling plate fixed in a relatively thin space below and parallel with said housing top to define a fresh air intake passage from said ports to said central hole in said insulation board, an air heating unit about the top portion of said tube, and shaped to define an annular hollow disk provided with heating elements between the upper and lower plates thereof and fixed adjacent the outer periphery of the plates, said heating unit provided with a central hole registering above said tube in communication therewith, and an electric fan removably operating within said central holes of said insulation board and heating unit and providing the means for pulling bottom air up through said tube out of said chamber and pulling fresh air entering said peripheral ports of the housing, through the thin space between said housing top and the ceiling plate and over into said central hole of the insulation board, as the incoming air receives an application of radiant heat through said ceiling plate from said chamber, and, at the same time, said fan forcing said fresh air and said bottom air out into said chamber under said insulation board and through said heat unit, respectively.

2. A brooder comprising a sheet metal housing having a sloping top with high center, and having a plurality of fresh air intake holes about the periphery of the top, a horizontal insulation board fixed adjacent the top center of the warming chamber defined by said top, and an inner ceiling plate fixed in relatively thin space relation to and under said top to define an overhead space above said warming chamber in the brooder, that will be in communication with said fresh air intake holes of the housing to cause said incoming fresh air to be preheated by radiation from said inner ceiling plate over said chamber as said air moves up toward the top central part of said chamber through said space between the housing top and the ceiling plate, an upright central tube suspended above the central portion of said chamber floor, a heating unit shaped to define an annular hollow heating disk provided with electric heating elements fixed adjacent the periphery thereof, said heating unit and said insulation board fixed above the same in spaced relation thereto each provided with a central hole registering above said upright tube, an electric fan operatively and removably registering within said central holes of said insulation board and said heating unit directly above said upright tube and operating on a vertical shaft; whereby when said heating elements are turned on and said electric fan is functioning it will pull bottom air up through said tube from the bottom of said chamber and force the same, for reheating, out through said heating unit and said heating elements again into the chamber for circulating the air, and whereby said incoming fresh air passing through the space between said ceiling plate and said housing top will be drawn by said fan down into said central hole of said insulation plate and radially forced out into said chamber over said heating unit and will receive an application of radiant heat from said ceiling plate as said incoming air moves toward the fan from said intake ports through said thin passage under said housing top.

3. A brooder comprising in operative combination, a sheet material housing, shaped to define a warming chamber for chicks and the like, said housing having its roof portion sloping, a central upright intake vent pipe open at the bottom for the intake of bottom air from said chamber, for reheating, a ceiling plate spaced beneath and parallel to said sloping top of said housing, a horizontally disposed insulation board having a central hole and fixed adjacent the top central portion of said housing and connected with said ceiling plate, a pair of spaced horizontally disposed co-registering plates arranged in their spaced relation to provide a narrow passage for a divergent movement of circulating air, a central hole in each of said co-registering plates and a heating element operatively fixed adjacent the periphery between said plates to warm said circulating air as it moves past said element, the top plate of said co-registering plates spaced below said insulation board, to define a distributing outlet passage for circulating in said chamber the incoming fresh air which enters said chamber, an electric fan operating in said central hole position of said co-registering plates and said insulation board and communicating with said upright central tube, and with said air distributing spaces said housing provided adjacent its peripheral sides with a plurality of air intake holes communicating with the thin passage between said ceiling plate and said housing top, to cause said fresh air entering said thin passage to become preheated by radiant heat passing up from said ceiling plate and before said air is drawn down into said fan and distributed out into said chamber between said insulation board and said heating unit defined by said heating plates.

ALBERT E. ANDERSON.